United States Patent [19]

Sohyer

[11] Patent Number: 4,527,871
[45] Date of Patent: Jul. 9, 1985

[54] EYEGLASS FRAME FRONT WITH FLEXIBLE TIES

[75] Inventor: Jean-Pierre Sohyer, Dompcevrin, France

[73] Assignee: Essilor International Cie Generale d'Optique, Creteil, France

[21] Appl. No.: 476,795

[22] Filed: Mar. 18, 1983

[30] Foreign Application Priority Data

Apr. 1, 1982 [FR] France .................. 82 05653

[51] Int. Cl.³ .................. G02C 1/04; G02C 5/12
[52] U.S. Cl. .................. 351/106; 351/137; 351/154
[58] Field of Search .................. 351/137, 138, 106, 78, 351/79, 80, 154, 133

[56] References Cited

FOREIGN PATENT DOCUMENTS 102150A 1/1983 United Kingdom .................. 351/138

Primary Examiner—Rodney B. Bovernick
Attorney, Agent, or Firm—Charles A. Brown; Charles E. Brown

[57] ABSTRACT

An eyeglass frame comprises a main support structure, a pair of rims each comprising a relatively rigid upper rim member and a flexible tie attached at its ends to the upper rim member. The nose pads have grooves for receiving them on inner terminal parts of the respective upper rim members. There are two transverse holes in the terminal part of each upper rim member. A passageway continues each groove through a land in each nose pad. The ends portion of each tie is threaded upwards through the passageway and then through the holes in the upper rim member for attachment thereto. The inner surfaces of the nose pads bearing against the wearer's nose have no recesses or the like for collecting dirt or grease.

6 Claims, 4 Drawing Figures

EYEGLASS FRAME FRONT WITH FLEXIBLE TIES

BACKGROUND OF THE INVENTION

The present invention relates generally to eyeglass or spectacle frames.

In a copending application Ser. No. 393,548 filed June 30, 1982, assigned to the assignee of the present application, there is described a spectacle frame comprising a support structure, two rims or surrounds each adapted to receive an ophthalmic lens and two nose pads adapted to bear on the wearer's nose. Each of the rims is formed by a rail or relatively rigid upper rim member and a flexible retaining member or tie attached to the upper rim member at each end thereof. The inner or bridge end of each upper rim member and the corresponding nose pads have two holes adapted to be brought into registry to permit the tie to be passed through each set of holes thereby securing the nose pads to the respective upper rim members.

According to an embodiment of the foregoing application, each nose pad comprises a groove adapted to interfit along a corresponding part of each of the upper rim members. The holes in the nose pads extend transversely therethrough into the corresponding grooves and lie in a plan substantially parallel to the general plane of the frame.

This arrangement provides good securement of the nose pads on the upper rim members but in practice it is not devoid of drawbacks.

First of all, the holes in the upper rim members and in the nose pads must be drilled with precision and therefore the drilling of the holes not only requires appropriate tooling but is also rather time-consuming.

Moreover, the double passage of the tie through the holes in both the upper rim members and the corresponding nose pads involves some difficulties in positioning and aligning the holes and forming the double passage through the corresponding components.

Further, although the nose pads are provided with a recess so that the tie does not protrude onto the inner surface of the nose pads with which the wearer's nose is in contact, facial dirt and grease may collect therein. The recesses are also rather difficult to clean and are therefore unhygienic and may become unsightly.

SUMMARY OF THE INVENTION

An object of the invention is to provide an eyeglass frame which permits the foregoing, briefly described drawbacks to be overcome and which is of simpler construction without impairing the overall appearance of the eyeglass frame.

According to the invention there is provided an eyeglass frame wherein each of the nose pads has a smooth, nonperforate surface for contact with the wearer's nose and an internal passageway through which an end of the associated tie runs upwardly to be threaded through a pair of spaced holes in the upper rim member.

With such an arrangement the drawbacks mentioned above are avoided in a simple manner providing other substantial advantages.

First of all, there is a pair of holes in the inner or bridge end of the upper rim members for attachment of the tie and no correspondingpair of holes in the nose pads, but rather an internal passageway running upward through the nose pad which may be formed without any particular difficulties.

The tie is passed through two holes in the upper rim member for attachment thereto and therefore the attachment involves only the upper rim member and the tie and not the nose pad, thereby making the assembly operation easier since it is not necessary to bring pairs of holes in each nose pad and in each rail into registry before threading the tie therethrough.

The lenses are also easier to mount in the rims. They may be simply snapped into position which means that the lens can be changed very easily if necessary.

Further, the cleaning of the surfaces of the nose pads which bear against the wearer's nose is made substantially easier compared to the above-discussed prior application since these bearing surfaces are smooth and devoid of recesses mentioned above which trap dirt and grease.

Finally, the elimination of the transverse holes through the nose pads improves the overall appearance of the eyeglass frames of the present invention compared to the above-mentioned eyeglass frame.

These and other features and advantages of the invention will be brought out in the description which follows, given by way of example, with reference to the accompanying drawings.

DESCRIPTION OF THE PREFERRED EMBODIMENTS

Figure 1:
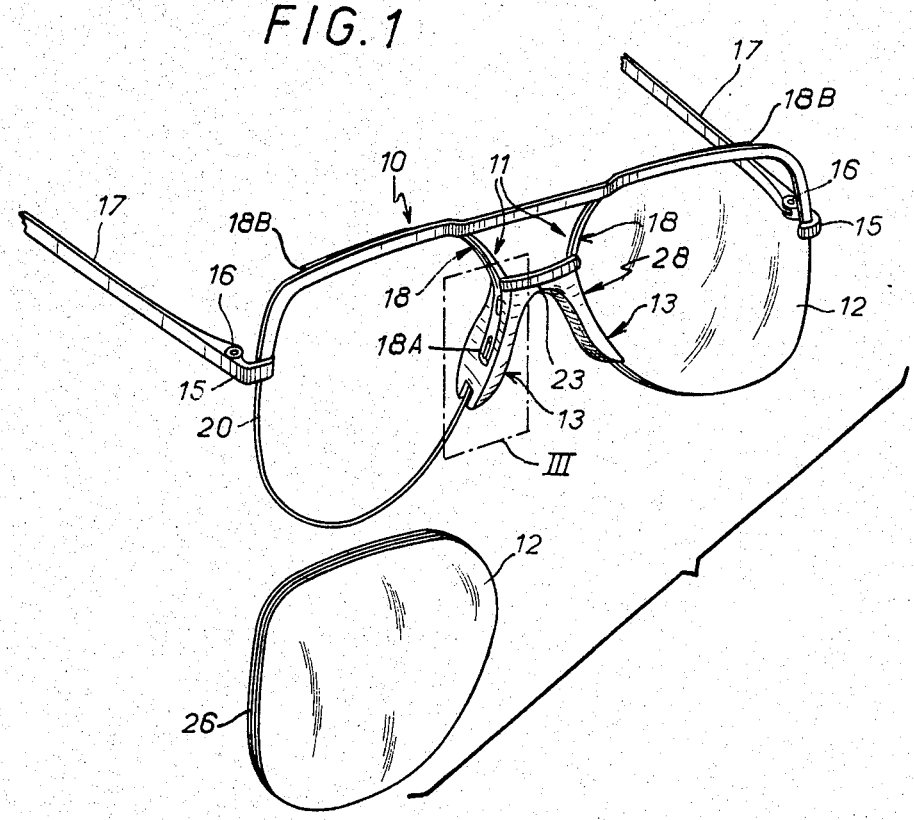
FIG. 1 is a perspective view of an eyeglass frame with one lens in position and the other lens ready to be mounted, the nose pads being formed on a single bridge member.

As shown in FIG. 1 and known per se, eyeglass frame comprises a main support structure 10, two rims or surrounds 11 each adapted to receive an ophthalmic lens 12 which may be a corrective lens, a protective lens or even a mere sun lens, and two nose pads 13 adapted to bear on the respective sides of the wearer's nose.

In the illustrated embodiment the main support structure 10 is defined by a simple bar member which has a generally straight long intermediate zone and downturned portions at the ends thereof. A knuckle 15 is provided at the ends of the bar member, and a hinge 16 pivotally mounts each sidepiece 17 on the corresponding knuckle 15.

Each rim 11 comprises a relatively rigid upper rim member or rail 18 fixed to the back of the bar member, and a flexible tie or retaining member 20 comprising a wire or thread, e.g. of metal or preferably of plastic material, such as nylon.

Each upper rim member 18 has a channel shaped section and is longitudinally arcuate extending from an inner or bridge end 18A to an outer or temple end 18B. Each upper rim member 18 follows the contour of the corresponding part of the bar member and is fixed thereto by a front section. Since the bar member and the upper rim member are made of metal in the illustrated embodiment they are secured together by soldering.

In the illustrated embodiment the upper rim members or rails 18 are secured to each other at their bridge end 21 by a middle member 23 which extends generally parallel to the intermediate portion of the main bar member thereabove.

Each flexible tie 20 is adapted to be attached near each end 18A, 18B of the corresponding upper rim member 18. Accordingly the inner or bridge end 18A of each of the upper rim members (see FIG. 3) has a pair of holes 24 formed in the bottom wall of the channel-shaped upper rim member through both of which the associated tie 20 is adapted to be threaded, whereby the end of the tie passes twice through its upper rim member.

Each upper rim member 18 has a median rib 25 protruding from the bight portion of the channel-shaped section thereof and extends from the vicinity of the temple or outer end approximately. to the level of the middle bar 23 so that the inner or bridge terminal portion of the upper rim member having the pair of holes therethrough is devoid of any ridge. Preferably, the median rib 25 extends inwardly beyond the sidewalls of the channel-shaped section. The ophthalmic lens 12 for each rim preferably has a grooved peripheral edge 26 for receiving the median rib 25 protruding from the upper rim member 18 along part of its periphery and the flexible tie 20 along the remainder of its periphery, as discussed below.

Figure 2:
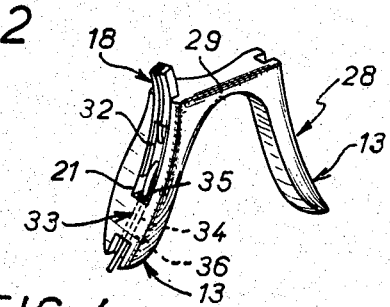
FIG. 2 is a perspective view of the bridge member of FIG. 1 on an enlarged scale.
Figure 3:
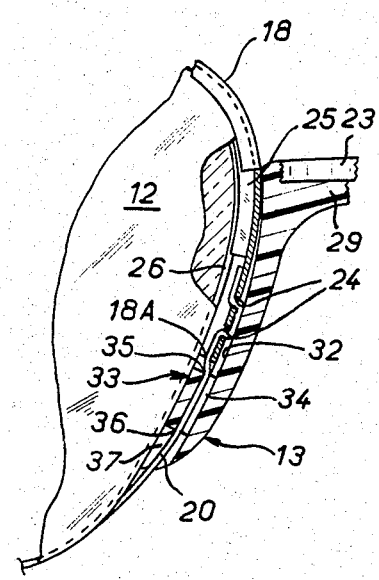
FIG. 3 shows on an even larger scale the zone included in the phantom line rectangle in FIG. 1.

In the embodiment illustrated in FIGS. 1-3 the nose pads are part of a single, one-piece bridge member 28. The nose pads 13 are joined at their upper ends by a common cross member 29. Each of the nose pads 13 also has a groove 32 running from its upper end for receiving the terminal part of the corresponding upper rim member 18.

According to the invention an internal passageway 34 runs downwards through a land 33 at the lower end of the groove 32 in each nose pads 13, the internal passageway 34 having an opening 35 into the groove 32 at its upper end and another opening 36 which in turn opens into a groove 37 running to the lower end of the nose pad.

The land 33 is preferably molded in one-piece with the associated nose pad when the latter is made of plastic material and secured to the associated nose pad when the nose pad is made of metal.

In the illustrated embodiment the land 33 is molded with the rest of the associated nose pad 13 and the internal passageway 34 is drilled therethrough.

Obviously the length of the land 33 may vary but the passageway 34 is preferably straight and is substantially in continuity with the path of the tie which is threaded therethrough so that the tie has no sharp curves at this level. Advantageously, the passageway 34 is in smooth continuity with the inner wall of the groove 32 in the nose pad 13. It will be noted that the outer surface of the land 33 is in smooth continuity with the surrounding surfaces of the rest of the outer side of the nose pad.

As shown in FIG. 3 in particular, each upper rim member 18 comprises in its inner terminal part devoid of the median rib 25, two spaced apart holes 24 to permit the end of the tie 20 to pass back and forth or twice through the upper rim member 18 after the tie 20 is threaded upwardly through the internal passageway 33. The holes 24 are spaced from the opening 35 of the passageway 33 into groove 32.

The bridge member 28 is in effect slidably mounted on the ties 20. Before inserting the lens 12 into the rims the grooves 32 in the nose bridge member 28 are brought into interfitting relation with the inner terminal parts of the corresponding upper rim members 18.

The bridge member 28 is thus firmly held in place transversely with respect to the general plane of the frame front. Its vertical position is determined by the abutment of the cross member 29 against the middle bar member 23. In other words the bridge member 28 cooperates through its nose pads 13 and its cross member 29 respectively with the upper rim members 18 and the middle bar member 23. The bridge member 28 is thus firmly secured in position when the lens 12 are inserted into the rims by the tensioning of the ties 20. The length of the ties 20 is determined so that the ties 20 snap into. place in the peripheral groove 26 in the lenses to confer totally satisfactory rigidity.

It will be appreciated that the securement of the bridge member 28 to the upper rim members 18 is effected merely by the passage of the ties 20 through their passageways 34. It will be readily understood that the present invention solves the problems posed by the above mentioned application in a particularly simple manner.

Figure 4:
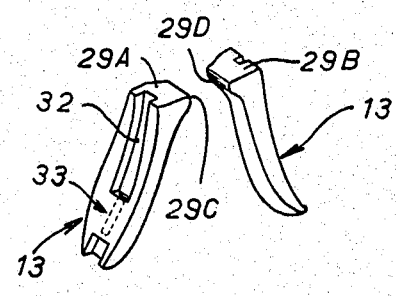
FIG. 4 is a perspective view of a pair of nose pads according to an alternative embodiment in conformity with the invention.

In the FIG. 4 embodiment the nose pads 13 are defined as two separate components. In other words there is no common cross member as in the previous embodiment. Each nose pad 13 comprises features similar to those of the nose pads of the previous embodiment, namely, a groove 32 and a passageway 34 through a land 33. The nose pads 13 are advantageously provided with upper transverse ends 29A, 29B having inwardly directly edge portions 29C, 29D which are adapted to abut against each other when the nose pads are mounted in position on their respective upper rim members.

It will be understood that the present invention is not intended to be limited to the illustrated and described embodiments but admits of various alternatives and modifications without departing from the spirit and scope of the appended claims.

What I claim is:

1. An eyeglass frame front comprising a main suppo structure, two rims for receiving ophthalmic lenses, two nose pads for bearing against the wearer's nose, each of said rims comprising a relatively rigid upper rim member and a flexible tie member attached at its ends to said upper rim member, a pair of transverse holes provided in an inner or bridge terminal part of each of said upper rim members for receiving end portion of the associated tie member, each of said nose pads having a continuous inner surface for contact with the wearer's nose, each of said nose pads having a groove for engaging said nose pad on said inner terminal part of the associated upper rim member, a passageway continuing the groove in each of said nose pads toward the lower end thereof, said end portion of each of said tie members being threadable upwards through said passageway in the associated nose pad and then successively through each of said holes in the associated upper rim member for attachment thereto.

2. The eyeglass frame front of claim 1, wherein each of said passageways opens into its associated groove substantially at level withthe inner wall thereof.

3. The eyeglass frame front of claim 1, wherein the axis of each of said passageways is in continuity with the axis of its associated groove.

4. The eyeglass frame front of claim 1, wherein the end of each passageway remote from the groove in the associated nose pad opens in the immediate vicinity of the lower end of said associated nose pad.

5. An eyeglass frame according to claim 1, said eyeglass frame front having sidepieces pivotally mounted at the respective ends of the main support structure.

6. The eyeglass frame front of claim 1, wherein there is a land located in the lower half of the associated nose pad, and each of said passageways runs through one of said lands in continuity with the rest of the outer surface of the associated nose pad.

* * * * *